United States Patent [19]

Jeffrey

[11] 4,010,656
[45] Mar. 8, 1977

[54] POWER TRANSMISSION DRIVE

[75] Inventor: Joseph O. Jeffrey, Ithaca, N.Y.

[73] Assignee: Borg-Warner Corporation, Chicago, Ill.

[22] Filed: Feb. 7, 1974

[21] Appl. No.: 440,440

[52] U.S. Cl. .............................. 74/245 S; 74/250 S; 74/251 S; 74/253 S

[51] Int. Cl.² .................. F16G 15/00; F16G 15/12

[58] Field of Search .......... 74/245 S, 250 R, 250 S, 74/251 S, 253 R, 253 S, 255 S, 245 R, 251 R, 235; 59/5, 7, 8

[56] References Cited

UNITED STATES PATENTS

| | | | |
|---|---|---|---|
| 799,073 | 9/1905 | Morse | 74/253 S |
| 1,269,656 | 6/1918 | Stewart | 74/253 S |
| 1,377,268 | 5/1921 | Nelson | 74/235 |
| 1,604,059 | 10/1926 | Matsumoto | 74/235 |
| 1,770,989 | 7/1930 | Morse | 74/253 S |
| 1,819,185 | 8/1931 | Matsumoto | 74/235 |
| 1,849,684 | 3/1932 | Morse | 74/250 S |
| 1,947,734 | 2/1934 | Perry | 74/253 S |
| 2,266,688 | 12/1941 | Keller | 74/245 R |
| 3,213,699 | 10/1965 | Terepin | 74/251 R |
| 3,540,302 | 11/1970 | Bendall | 74/253 R |
| 3,742,776 | 7/1973 | Avramidis | 74/253 S |

Primary Examiner—Samuel Scott
Assistant Examiner—Allan R. Burke
Attorney, Agent, or Firm—Aubrey L. Burgess

[57] ABSTRACT

A power transmission drive comprising driving and driven sprockets interconnected by a chain consisting of interlaced ranks of links having projecting toes to engage the tooth gaps of said sprockets and articulated by two-part pivots disposed transversely through aligned apertures in the links, the cross-section of each pivot part having generally the shape of a three-lobed convex hypotrochoid and the said apertures having generally the shape of a longitudinal section through a chicken egg.

37 Claims, 12 Drawing Figures

$a \approx .3$

FIG.8.

$a \approx .5$

$a \approx .16$

FIG.12

POWER TRANSMISSION DRIVE

BACKGROUND OF THE INVENTION

In the early history of power transmission chain, inverted tooth or silent chain was constructed of sets of links connected together at articulating joints by circular pins. Later, the pin was replaced with a two part joint comprising a pin and a rocker having abutting surfaces, one of which is rockable on the other. Various configurations of pins and rockers have been suggested in the prior art. For example, U.S. Pat. No. 3,213,699, describes a pin and rocker joint constructed from pins and rockers which are substantially identical to each other in section. Each pin and rocker taught by the above patent has an arcuate rocking surface, and an arcuate back surface substantially concentric with the rocking surface. When assemblying a chain with such a pin and rocker configuration, it is possible, by rotating a pin rocker through 180°, to improperly position it in the link apertures. This may not be detected upon inspection, and leads to early chain failure and improper operation. Because each of these components has only one working surface suitable for rocking engagement with the other when this surface becomes worn, both components must be replaced.

Another problem encountered with the use of the pins and rockers of the above identified patent is that the apertures in the links through which the pins and rockers extend must necessarily have portions with irregularities such as reentrant angles and small radii to properly position the joint elements. This results in high stress concentration in the vicinity of such abnormalities and small radii. Accordingly, the links must be made larger and/or of different shape than they would need be if the stress concentration were reduced.

THE INVENTION

According to the present invention, a two part pivot comprising a pin and a rocker is used for connecting sets of links of an inverted tooth power transmission chain. In the preferred embodiment, the cross-section of each pin and rocker is identical in shape and area, and is of generally equilateral, three-lobed, triangular section, such as a convex three-lobed hypotrochoid. A hypotrochoid is a curve generated by a point on the radius r of a rolling circle which rolls on the inside of a fixed circle having a radius R. When R equals 3r, the curve generated will be three-lobed. More particularly, the pins and rockers are defined by arcuate side surfaces having a relatively large radius of curvature with adjacent surfaces joined by corners each having an arcuate surface of smaller radius. Each pin and rocker section of the preferred embodiment is symmetrical about axes located at 120° apart. Because all such pivot parts are identical in cross-section and are equilateral, each part of each pair can be placed in any of three correct general orientations relative to the other for insertion through the apertures in the links, thus making assembly easier than in prior art chains wherein fewer orientations are correct. The apertures are so designed that after insertion of the pivot parts and when the assembly is axially loaded, each pivot part will automatically seek and achieve one of three correct precise orientations relative to the other and to the apertures. Therefore, insertion of the pivot parts through the apertures without damage to any of the parts has been facilitated, and any way the pivot parts can be inserted through the apertures without damage to any of the parts is correct.

The generally triangular, three-lobed cross-sectional shape of the pins and rockers or pivot parts is relatively economical to manufacture, and there is much less distortion of these parts from heat treating, as compared with distortion of shapes taught in the prior art.

Each pivot part according to this invention has three working surfaces, so that if wear occurs on the rocking surfaces, the chain can be repinned after initial manufacture by rotating one or both the pins and rockers through 120°. Each toed link is provided with a pair of apertures, each designed to receive a two-part pivot, to retain one part thereof, and to provide sufficient clearance for the other part to move in rolling contact with the part retained. In the preferred embodiment, each aperture is generally ovate in shape, which when used herein and in the claims hereof, is defined as the shape of a longitudinal section through a chicken egg. Each aperture is symmetrical about its own longitudinal center line; each aperture is congruent with the other; and the pair of apertures is symmetrically disposed about the axis of symmetry of the link with the broader ends closer to each other than are the narrower ends in which the retained pivot parts fit, and with the broader ends generally farther from a line tangent to both toe tips than are the narrower ends.

Within the purview of this invention, the link apertures need not be obliquely oriented. For example, the longitudinal center lines of the apertures can be colinear with the line of pull of the chain when straight or, obliquely oriented in the opposite manner than that illustrated. The inverted tooth links in the chain are identical in construction, although other link forms can be used. All guide links are also identical. Thus, the chain is constructed of inverted tooth links of one form and guide links of another form with pins and rockers joining them together. Further, the chain can be manufactured and/or assembled with opposed teeth, i.e., teeth facing in opposite directions, if so desired.

The link aperture shape has a continuously smooth wall configuration which substantially reduces high stress concentrations which would prevail in a link having the modified generally circular shaped apertures of the prior art which included portions having relatively sharp corners. The link apertures of this invention provides an opening for receiving pins with substantially the same pin area for a given chain size as in the prior art construction. Further, each link aperture according to this invention has a force transmitting wall surface comprising curved sides connected by a curve of lesser radii at the smaller end thereof which receives a pin having substantially complementary sides and a curve to conform with the force-transmitting surface to provide a complete seating engagement between the pin and the aperture when the chain is loaded. The results in a link having greatly reduced stress concentrations and provides a chain with a remarkable increase in tensile strength when compared with prior art chains.

While the pivot parts in the preferred embodiment have been described and are latter described as being identical in cross section, it is to be understood that the two parts of the pivot parts could differ from each other in size and shape within the purview of this invention. For example, one part could be of a larger cross-section that the other and yet be of the same shape; the parts could be of different cross-sections, each still being generally triangular or generated as three-lobed hypotrochoids.

Another significant aspect of the invention is the fact that the radius of the curve between two adjacent surfaces of the pin is the same as the radius of the curve between the corresponding surfaces of the aperture at the smaller end when the chain is loaded. When the chain is assembled, the links are arranged in interlaced and overlapping relationship and then the pivot parts are inserted through the registered apertures forming a continuous passage through a series of links. After the pivot parts are properly located and secured, the chain is subjected to a tensile load or proof load to fully seat the pivot parts.

DETAILED DESCRIPTION OF THE PREFERRED EMBODIMENT

Figure 1:
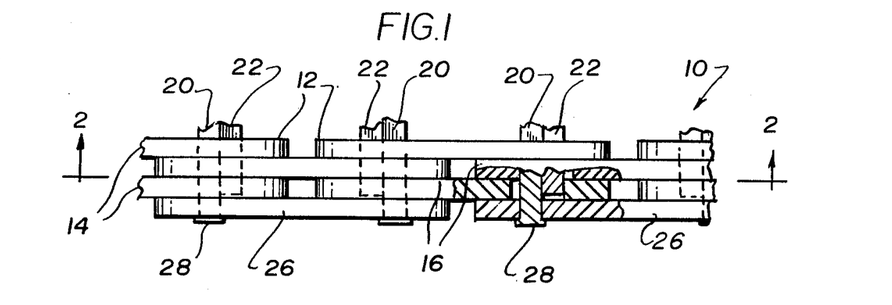
FIG. 1 is a partial plan view, with parts broken away, of a chain made according to this invention.
Figure 2:
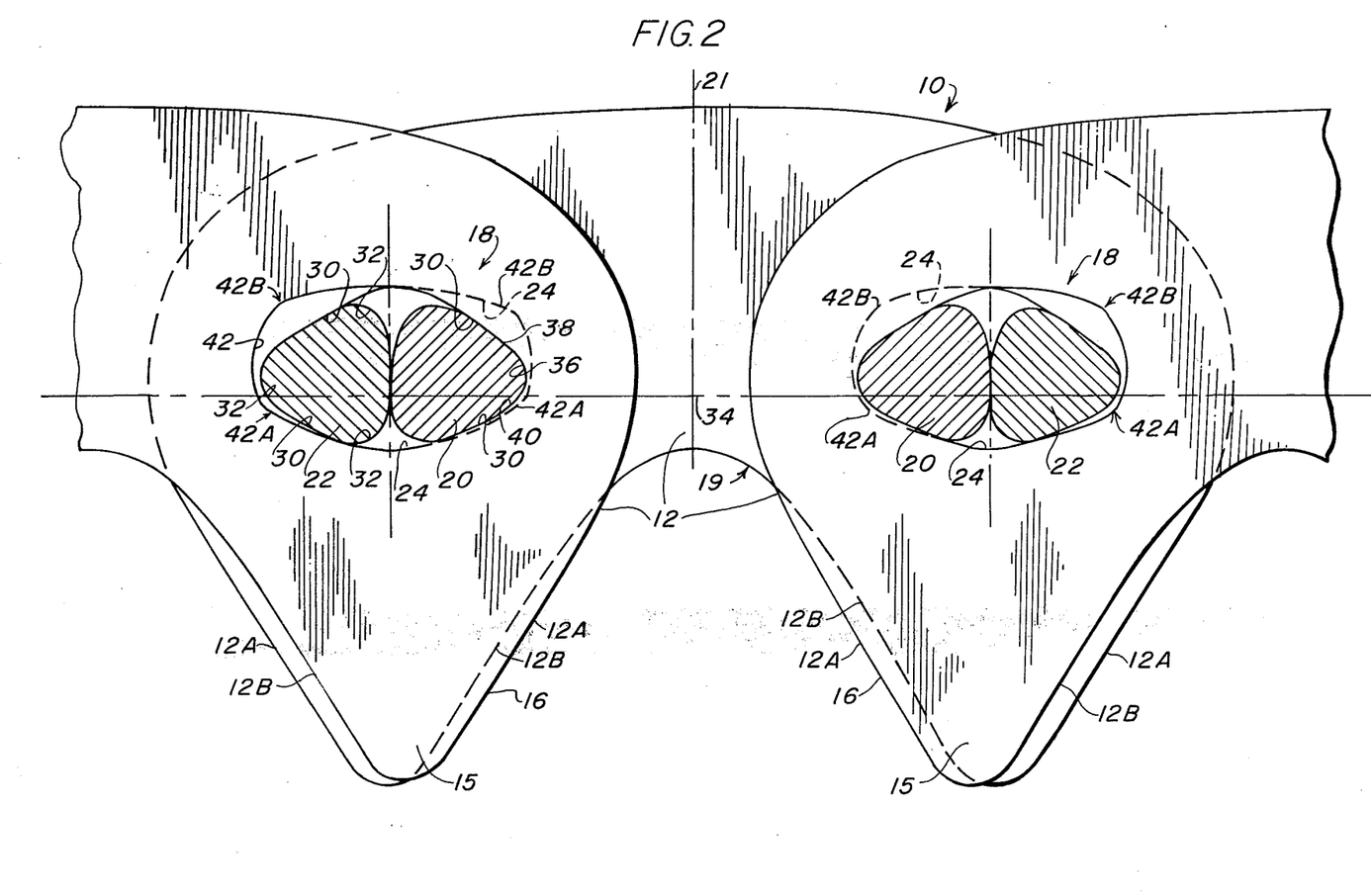
FIG. 2 is an enlarged side view of the chain taken on line 2—2 of FIG. 1 with the pivot parts shown in section.

Referring now to the drawings, and especially FIGS. 1 and 2, there is illustrated a preferred embodiment and an inverted tooth chain 10 which comprises a plurality of identical inverted toothed links 12 assembled as alternately positioned sets 14 and 16 of aligned links. The sets 14 and 16 of aligned links are interconnected by pin and rocker joint means 18 comprising the pivot parts, i.e., a pin 20 and rocker 22, each being substantially identical in cross section which are received in link apertures 24.

Outside guide links 26 flank the assembled sets of links to position the chain 10 on a sprocket. Alternately, inside guide links (not shown) are used to position a chain on a grooved sprocket. The pin 20 is longer than the rocker 22 and is provided at its ends with means such as riveting or the use of a cotter pin to secure the outermost links and retain the links in the assembly.

The only dimensional difference between a pin and a rocker is the length, i.e., the length of the pin is greater than the rocker, the only functional difference between a pin and a rocker is that the pin functions to hold the chain together laterally. Thus in the following the pin and rocker will be referred to as joint or pivot parts.

In the preferred embodiment, each of the joint or pivot parts 20, 22 is identical in cross-sectional shape and area. Each is substantially triangular or three-lobed, with arcuate side surfaces 30 having relatively large radii of curvature, the adjacent surfaces 30 of wich are joined by arcuate corners 32 having smaller radii of curvature, so as to be symmetrical about axes located 120° apart. A suitable shape is the hypotrochoid of three lobes which can be generated as will be described herein.

An important aspect of the invention relates to the design of the links, particularly with respect to the shape and location of the apertures through which the pivot parts extend. In the enlarged detailed drawing of FIG. 3 it can be seen that the downwardly extending outer toes 15 are joined by a smooth continuous surface 17. The flanks 12A of the links engage the driving means, which may be teeth on a rotating member or sprocket in the driving assembly. The inner flanks 12B may or may not engage the driving means.

The line of pull 34 is an imaginary line which extends from the contact between the pivot parts of one aperture to the contact between the pivot parts of the other aperture. In a straight chain, all lines of pull are parallel and coplanar and lie in the position relative to the link as indicated by line 34 in FIGS. 2, 3, and 4. Photoelastic analysis verified that the design of the shape and location of the apertures 24 which locate the line of pull 34 is such that the maximum stresses adjacent to the upper and lower surfaces 38 and 40 of the apertures are substantially equal to each other, and the crotch 19 is located far enough below the line of pull 34 and is so shaped that the maximum stress in the crotch surface equal but does not exceed the aperture surface stresses when the chain is loaded. This balance of these critical stresses has also been confirmed by tensile and fatigue tests of ⅜ inch pitch chains in which approximately the same number of links break through the crotch to the link back as fail by fracture initiated at the aperture surfaces.

Each of the apertures 24 is disposed in symmetrical relationship to the center line 21 and each is equidistant therefrom. Apertures 24 are generally ovate, defined herein as the shape of a longitudinal section through a chicken egg. In the embodiment illustrated, the center line 46 of the aperture 24, about which the aperture is symmetrical, is obliquely oriented with respect to the line of pull of the chain when the chain is straight, the straight chain line of pull being identified on the links illustrated in FIGS. 2, 3, and 4, as 34. Each aperture 24 is elongated and has smooth walls, the major center line 46 of each aperture 24 extending generally in the direction of the length of each link.

The centerline of the link aperture 24, about which the aperture is symmetrical, can be on the line of pull of the chain when straight, without departing from the spirit of the invention. It can also be obliquely oriented to a different degree than illustrated.

For purposes of this disclosure it is necessary to identify various sections of the surface forming the individual apertures and the pivot parts. The aperture has been earlier referred to as having the shape of longitudinal section through a chicken egg, (the implication being that it differs from a true elipse) having one end smaller than the opposite end. In any event, it is symmetrical about the center line 46.

Figure 5:
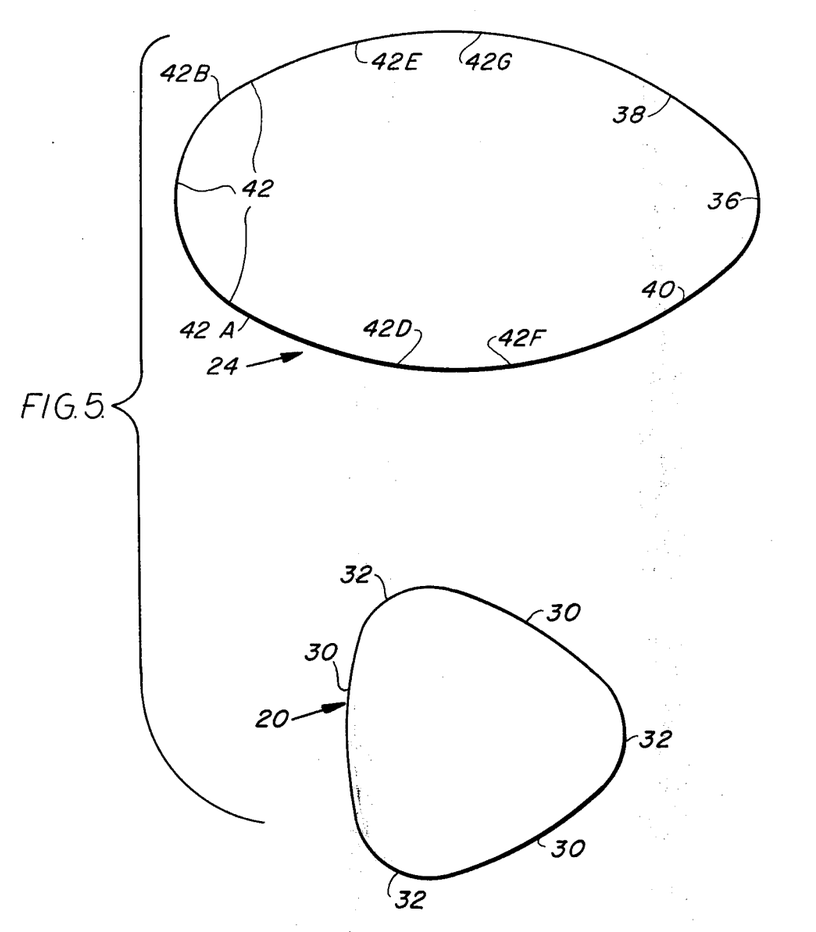
FIG. 5 is an illustration of the geometric shape of the aperture and the shape of the pivot parts.

In FIG. 5 the shape of the apertures 24 in the links and the shape of the surfaces on the pivot parts 20 and 22 are illustrated.

The aperture defining surfaces or walls are continuous and have no reentrant surfaces. This is extremely important in reducing stress concentration around the aperture. It will be noted that the aperture configuration includes a smaller end toward the ends of the link and a second relatively larger end located toward the center of the link.

Figure 3:
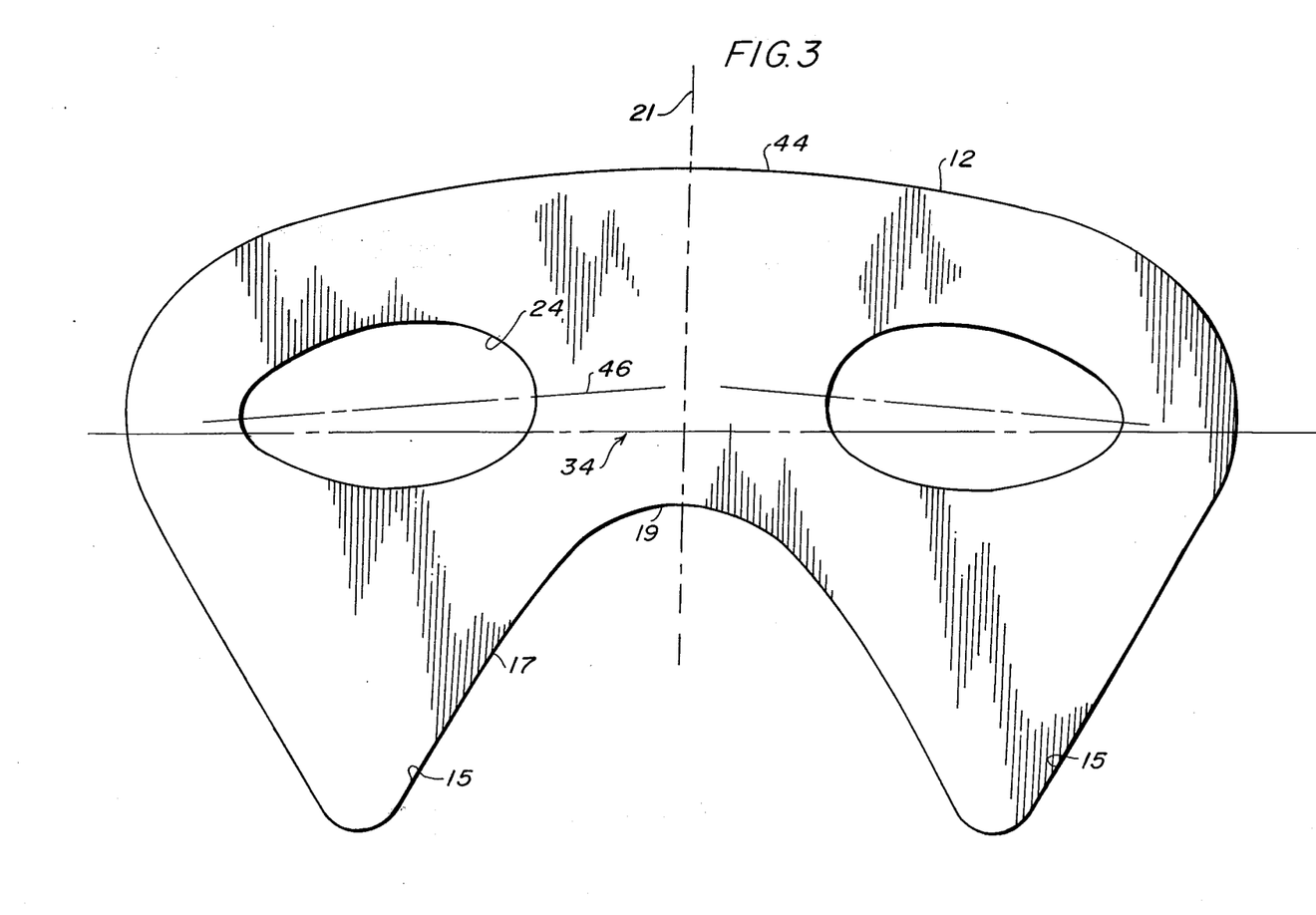
FIG. 3 is an elevational view of one form of link for the chain of FIG. 1 and 2.
Figure 4:
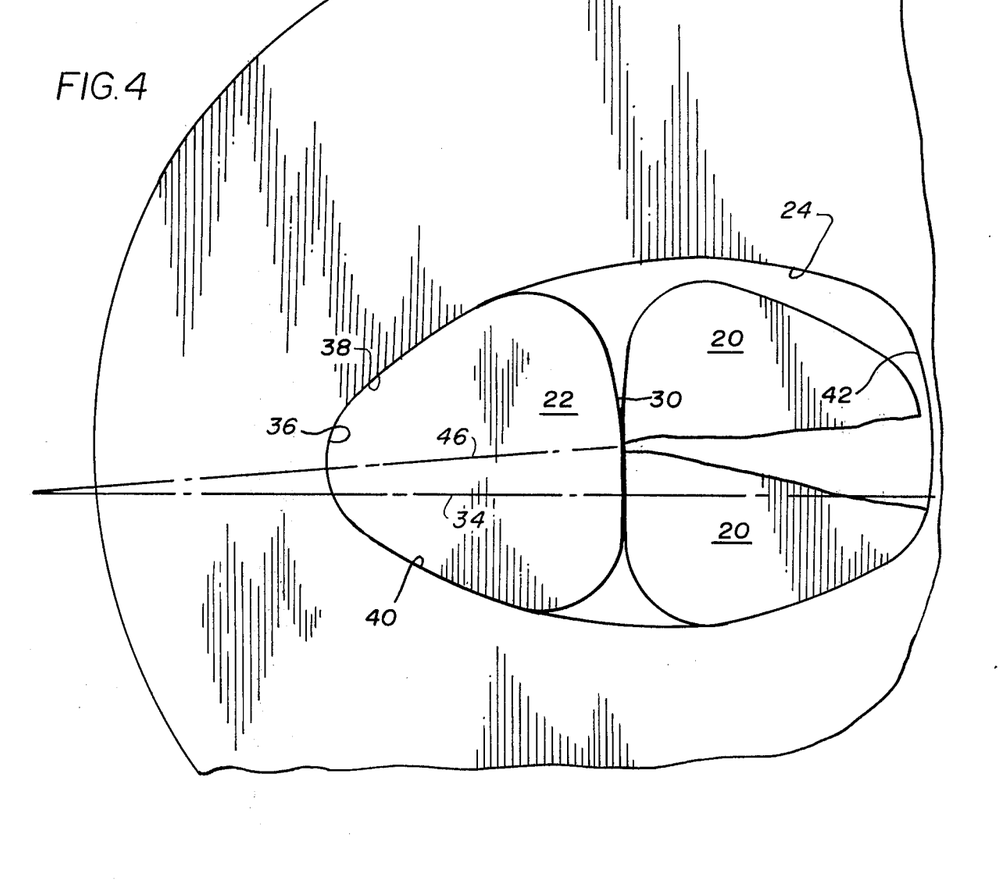
FIG. 4 is an illustration showing details of the pivot joint of this invention.

Each aperture 24 is shaped so that when the assembled chain is loaded one lobe of a pivot part abuts and engages the smaller wall end portion 36 of each aperture and the adjacent sides of the pivot part abut at least a portion of the two adjacent aperture wall surfaces 38 and 40. The aperture wall surfaces are curved substantially complementary to the curve of the surfaces 30 of the pivot parts 20 and 22 and converge toward each other at the end portion 36. Preferably, the aperture and the shape of the pivot part are such that the pivot part will engage the end portion 36 and completely seat therewith when the chain is put under tension loaded or stressed. The seating action insures complete surface to surface engagement between the pivot part and the aperture to reduce localized stresses in the link in the area of the end portion 36. The wall surface of end portion 36 and adjacent surfaces 38 and 40 comprise together a force transmitting surface in apertures 24 because the force transmitted through the chain acts between the pivot parts 20 or 22 and the surface of the aperture in the area of end portion 36. The other end 42 of each aperture 24 is enlarged as shown in FIGS. 2 and 4 to permit relative rolling motion between the pivot parts. In the preferred embodiment, the larger end portion 42 is terminated as shown in FIGS. 3 and 5 by a single, large radius circular arc which serves the dual purpose of further reducing stress concentrations in its vicinity and facilitating insertion of the pivot parts assembly by providing more clearance therefor. When the chain articulates to a curved path, there is a rocking motion between the pivot parts on the adjacent surfaces 30.

To provide a suitable pivot part section, and suitable surfaces 20, a hypotrochoid with three lobes can be generated, as will be now described.

Figure 6:
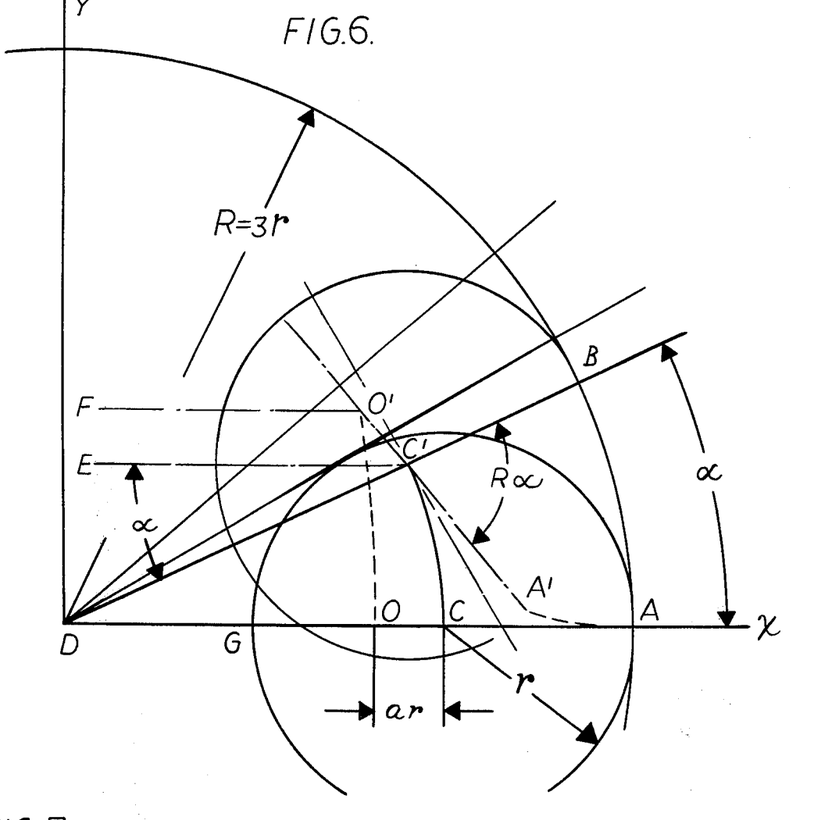
FIG. 6 is an illustration of the manner of generating the hypotrochoid of three lobes.
Figure 7:
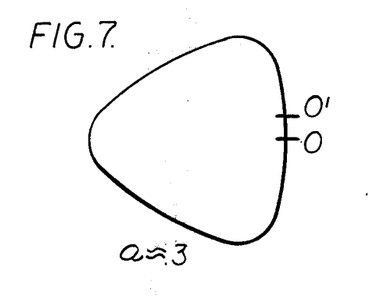
FIGS. 7 to 10 illustrate several hypotrochoids which can be generated for several values of the constant "$a$"
Figure 8:
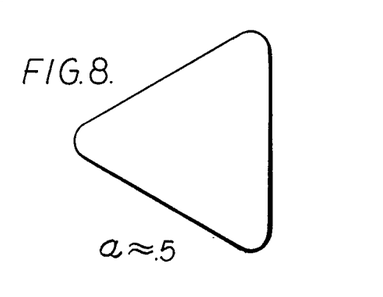
Figure 9:
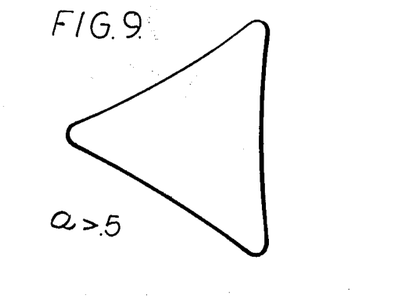
Figure 10:
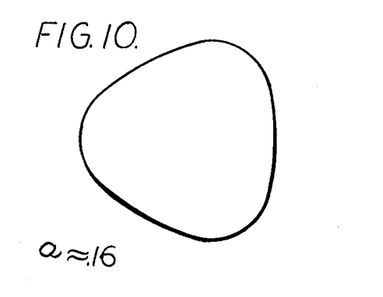

In FIG. 6, there is shown a generating circle having a radius $CA = r$ which rolls without slipping on the inside of a base circle of radius $DA = R$. Initially, the base circle is in contact with the generating circle at A, and point O is any point a distance $OC = ar$ from the center C of the generating circle. Assume that the generating circle rotates clockwise in contact with the inside of the base circle to point B. Then C will move to C'; A to A' and O to O'; and arc A'B will be equal to arc AB having length R $\alpha$, where $\alpha$ is expressed in radians.

Hence, angle $BC'A' = R \alpha/r$ $O'C'E = O'C'D - EC'D = (R \alpha/r) - \alpha = [ (R/r - 1] \alpha$ Also, $O'C' = OC = ar$
The y coordinate of point $0' = DF = DE + EF$ $DE = DC' \sin \alpha = (R - r) \sin \alpha$ $EF = O'C' \sin O'C'E = ar \sin [ R/r - 1) \alpha ]$
therefore $y = (R-r) \sin \alpha + ar \sin [ (R/r - 1) \alpha ]$
Similarly $x = (R-r) \cos \alpha - ar \cos [ (R/r - 1) \alpha ]$ In order for the curve generated by point O to close, it is necessary that the ratio of R to r, be an integer, and the value of this integer determines the number of lobes in the hypotrochoid. Here, for a three lobed hypotrochoid (the shape of pivot part) the integer must be 3.
Hence, putting $R = 3r$, the equations become $y = r (2 \sin \alpha + a \sin 2 \alpha )$ $x = r (2 \cos \alpha - a \cos 2 \alpha )$ Application of the calculus formulas for determining the radius of curvature $\rho$ and the slope $\tan \Theta$ of this radius to the above curve at any point will produce $$\rho = \frac{2r (1 + a^2 + 2 a \cos 3 \alpha)^{1.5}}{1 - 2a^2 - a \cos 3 \alpha}$$

$$\tan \theta = \frac{\sin \alpha - a \sin 2 \alpha}{\cos \alpha + a \cos 2 \alpha}$$

The table below gives values for $x/r$, $y/r$, $\rho/r$ and $\theta$ several values of $\alpha$.

| $\alpha$ | y/r | x/r | $\rho$/r | tan $\theta$ |
|---|---|---|---|---|
| 0 | 0 | 2 − a | 2 (1 + a)²/(1 − 2a) | 0 |
| 30° | 1 + .866a | 1.732 − .5a | 2(1 + a²)¹·⁵/(1 − 2a²) | $\frac{.5 - .866a}{.866 + .5a}$ |
| 60° | 1.732 + .866a | 1 + .5a | 2 (1 − a)²/(1 + 2a) | 1.732 |
| 180° | 0 | − (2 + a) | 2 (1 − a)²/(1 + 2a) | 0 |

FIGS. 7, 8, 9 and 10 of the drawings show several complete hypotrochoids. The radius r of the generating circle is the same for each figure and each figure has a base circle having a radius R equal to 3 r. The shapes differ from each other by the value chosen for the constant a. If a equals zero (0), the figure generated is obviously a circle of radius 2 r. As a increased to 0.5, the shape approaches that of a triangle with rounded corners. With a greater than 0.5, the sides become concave and the corners become sharper. When $a = 1.0$, the figure generated is given the special name hypocycloid. Its sides are more deeply concave and its sharp corners are points extending to the base circle.

Figure 11:
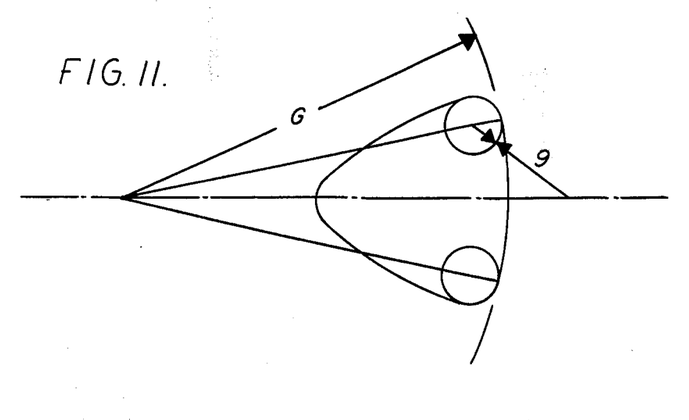
FIG. 11 illustrates the manner of developing a shape similar to a hypotrochoid.

For this invention, suitable values of a are in the range of more than zero and less than 0.5, preferably in the range of 0.15 to nearly 0.5. When the value a equals 0.3, the figure is similar to that shown in FIG. 7. This shape can be closely approximated by developing a figure using arcs of circles such as illustrated in FIG. 11 wherein the sides are formed of arcs of a circle having a radius G and the corners of a circle having a radius g. The arcs are struck on axes at 120° to each other.

All of the dimensions of the chain parts are preferably related to the pitch of the chain. The radius of the smaller end of the aperture is approximately 60% of the radius at the larger end; and the radius of the major surfaces on the pins are each preferably about half of the chain pitch, although it is understood that departures from these values are practical and are considered to be within the scope of this invention.

In view of the fact that each pivot pair has three working surfaces 30, when and if wear is detected on the rocking surfaces of adjacent pivot parts, the chain can be repinned by rotating one or both pivot parts through 120°, thereby presenting new or fresh rocking surfaces.

Since the link aperture shape has a continuous, smooth configuration, this eliminates high stress concentrations in the link caused by the modified generally circular shaped aperture and relatively sharp corners of the prior art. This smooth configuration and the elongated shape can provide an opening for receiving substantially the same pivot part area as in the prior art for the same size links.

The combination of pivot part and link aperture shapes results in a generally more uniformly stressed link providing a remarkable increase in chain tensile strength when compared with prior art chains. For example, a chain manufactured according to this invention has been found to be about 60% stronger in tensile strength when compared with a chain of equal pitch and width manufactured according to the prior art, such as depicted in the U.S. Pat. No. 3,213,699.

For comparing the tensile or breaking strength of chains manufactured from similar treated materials and according to this invention and those manufactured according to the prior art, such as in U.S. Pat. No. 3,219,699, having a ⅜ inch pitch, 2 inches wide and 82 pitches long were tested on a Riehle Universal Testing Machine. In this test, the machine is equipped with a pair of 4.50 inches diameter rolls, one of which is movable hydraulically and the load applied to the chain is measured in pounds.

Each chain is assembled, so as to be a continuous loop and the loop is placed over the two rollers. The machine is loaded hydraulically applying tension to the chain until breaking occurs and the loading of the chain is measured.

Two chains of each type were tested as described above. One of the chains manufactured in accordance with this invention broke at a load of 50,000 pounds; the other broke at a load of 49,300 pounds.

Two chains manufactured in accordance with the prior art were similarly tested. One chain broke at a load of 31,900 pounds while the other broke at a load of 31,300 pounds. In the second chain, it was observed that a link broke and the chain severely yielded at a load of 29,600 pounds and also at a load just under 31,000 pounds.

Taking an average of the two tests, it can be concluded that chain made according to this invention has an average breaking strength of about 60% greater than that of chain made according to the prior art as depicted in the aforesaid patent.

Figure 12:
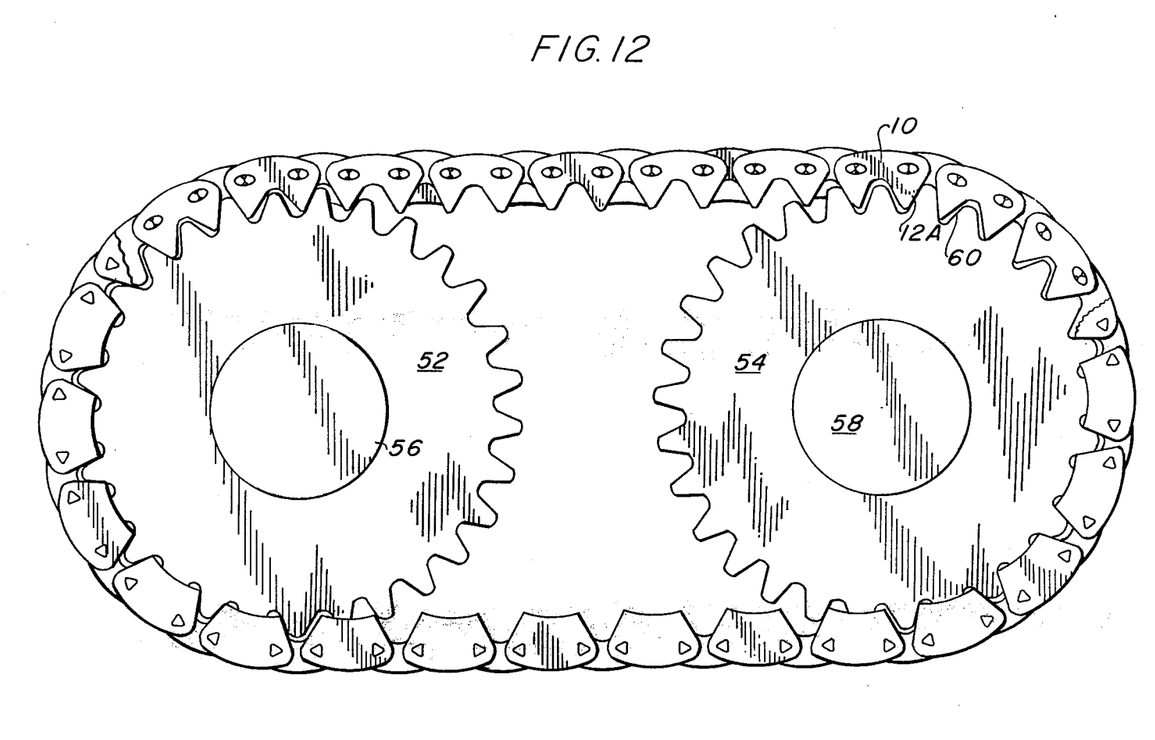
FIG. 12 is an illustration of a power transmission drive showing spaced sprockets interconnected by a chain constructed according to this invention.

FIG. 12 illustrated the chain 10 of this invention interconnecting a pair of sprockets 52 and 54, mounted on rotatable shafts 56 and 58, respectively, one of which is driven. As illustrated, the flanks 12A of the links engage the teeth gap walls 60 of the sprockets.

We claim:

1. A power transmission chain of the type adapted to cooperatively engage driving means on a rotating member comprising:
    a series of overlapping and interlaced sets of links having aligned apertures formed therethrough; and
    pivot means positioned apertures forming said chain with articulating joints;
    said pivot means comprising a pin and a rocker each of which is generally three lobed and generally trilateral in cross-section with three major surfaces, the adjacent ones of which are connected and with at least one of said pin and rocker having an arcuate major surface in rocking engagement with an adjacent major surface of the other.

2. A power transmission chain as recited in claim 1 wherein the cross-section of said pin and rocker is a hypotrochoid.

3. A power transmission chain adapted to cooperatively engage driving means on a rotating member comprising:
    a series of overlapping and interlaced sets of links having aligned apertures formed therethrough; and
    pivot means positioned in said apertures for interconnecting said links to form said chain;
    said pivot means comprising a pin and a rocker, each of which is substantially identical in cross-section shape;
    each pin and rocker being three-lobed in cross-section and having arcuate side surfaces of a relatively large radii joined by corners having arcuate surfaces of a relatively smaller radii.

4. A power transmission chain as recited in claim 3, in which each pin and rocker in section is generally equilateral.

5. A power transmission chain as recited in claim 3 in which each pin and rocker is substantially identical in cross-sectional area.

6. A power transmission chain as recited in claim 5 in which the radii of each pin and rocker surface of relatively large radii are equal.

7. A power transmission chain as recited in claim 6 in which the radii of each pin and rocker corner of relatively smaller radii are equal.

8. A power transmission chain as recited in claim 3 in which the apertures are spaced smooth walled openings which are elongated in the direction of the link length.

9. A power transmission chain as recited in claim 3 in which the apertures are generally ovate or egg shaped.

10. A transmission chain as recited in claim 9 in which each said aperture has aperture defining walls, portions of which are shaped to receive a corner and at least a portion of adjacent surfaces of a pin and rocker in abutting relationship.

11. A power transmission chain as recited in claim 9 in which the apertures are substantially symmetrical about a longitudinal centerline.

12. A power transmission chain as recited in claim 11 in which the longitudinal centerline of each aperture is obliquely positioned with respect to the line of pull of the chain when the chain is straight.

13. A power transmission chain as recited in claim 11 in which the longitudinal centerline of each aperture is directionally aligned with the line of pull of the chain.

14. A power transmission chain as recited in claim 3 in which at least portions of two adjacent arcuate surfaces of relatively large radii and the connected arcuate corner of the pin of a pivot means are abutted with a portion of the wall of the link apertures in one set of links and similar surfaces and connecting corner of the rocker of said pivot means are abutted and seat with the wall of the link apertures in the interleaved set of links.

15. A power transmission chain of the inverted tooth type having a series of overlapping and interlaced sets of elongated links and each link having a pair of apertures formed therethrough to receive a pivot means; and
  pivot means positioned in the apertures for interconnecting the links to form the chain; each pivot means comprising a pin and a rocker each of which has a generally three lobe-shaped cross section with engaging arcuate rocking surfaces, the rocking surfaces being joined to adjacent arcuate surfaces by corners having radii of smaller dimension;
  each aperture being elongated in the direction of link length and having a continuously smooth curved wall.

16. A power transmission chain as recited in claim 15, wherein said pivot means are generally triangular shaped in cross-section.

17. A power transmission chain as recited in claim 15 wherein said pivot means are convex hypotrochoid shaped in cross-section.

18. A power transmission drive comprising spaced rotating members with teeth and gaps therebetween and a chain of the type adapted to cooperatively engage rotating means, said chain comprising:
  a series of overlapping and interlaced sets of links with toes engaging the walls of the teeth and having aligned apertures formed therethrough; and
  pivot means positioned in apertures forming said chain with articulating joints;
  said pivot means comprising a pin and a rocker each of which is generally three lobed and generally trilateral in cross-section with three major surfaces, the adjacent ones of which are connected and with at least one of said pin and rocker having an arcuate major surface in rocking engagement with an adjacent major surface.

19. A power transmission drive as recited in claim 18 wherein the cross-section of said pin and rocker is a hypotrochoid.

20. A power transmission drive comprising spaced rotating members with teeth and gaps therebetween and a chain adapted to cooperatively engage said rotating members, said chain comprising:
  a series of overlapping and interlaced sets of links with toes engaging the walls of the gaps between the teeth, and having aligned apertures formed therethrough; and
  pivot means positioned in said apertures for interconnecting said links to form said chain;
  said pivot means comprising a pin and a rocker, each of which is substantially identical in cross-section shape;
  each pin and rocker being three-lobed in cross-section and having arcuate side surfaces of a relatively large radii joined by corners having arcuate surfaces of a relatively smaller radii.

21. A power transmission drive as recited in claim 20, in which each pin and rocker in section is generally equilateral.

22. A power transmission drive as recited in claim 20 in which each pin and rocker is substantially identical in cross-sectional area.

23. A power transmission drive as recited in claim 22 in which the radii of each pin and rocker surface of relatively large radii are equal.

24. A power transmission drive as recited in claim 23 in which the radii of each pin and rocker corner of relatively smaller radii are equal.

25. A power transmission drive as recited in claim 20 in which the apertures are spaced smooth walled openings which are elongated in the direction of the link length.

26. A power transmission drive as recited in claim 20 in which the apertures are generally ovate or egg shaped.

27. A power transmission drive as recited in claim 26 in which each said aperture has aperture defining walls, portions of which are shaped to receive a corner and at least a portion of adjacent surfaces of a pin and rocker in abutting relationship.

28. A power transmission drive as recited in claim 26 in which the apertures are substantially symmetrical about a longitudinal centerline.

29. A power transmission drive as recited in claim 28 in which the longitudinal centerline of each aperture is angularly positioned with respect to the line of pull of the chain when the chain is straight.

30. A power transmission drive as recited in claim 28 in which the longitudinal centerline of each aperture is directionally aligned with the line of pull of the chain.

31. A power transmission drive as recited in claim 20 in which at least portions of two adjacent arcuate surfaces of relatively large radii and the connected arcuate corner of the pin of a pivot means are abutted with a portion of the wall of the link apertures in one set of links and similar surfaces and connecting corner of the rocker of said pivot means are abutted and seat with the wall of the link apertures in the interleaved set of links.

32. A power transmission drive comprising driven members joined by a chain of the inverted tooth type having a series of overlapping and interlaced sets of elongated links, said driven members having teeth and gaps therebetween, each link having toes which engage the walls of the gaps of said driven members and a pair of apertures formed therethrough to receive a pivot means; and
  pivot means positioned in the apertures for interconnecting the links to form the chain; each pivot means comprising a pin and a rocker each of which has a generally three lobe-shaped cross section with engaging arcuate rocking surfaces, the rocking surfaces being joined to adjacent arcuate surfaces by corners having radii of smaller dimension;
  each aperture being elongated in the direction of link length and having a continuously smooth curved wall.

33. A power transmission drive as recited in claim 32 wherein said pivot means are generally triangular shaped in cross-section.

34. A power transmission drive as recited in claim 32 wherein said pivot means are convex hypotrochoid shaped in cross-section.

35. A pivot pin adapted for use only in a power transmission chain which is an assembly of sets of overlapping apertured links interconnected by pivot pins in the link apertures, each said pivot pin having a convex three-lobed hypotrochoid cross section.

36. A power transmission chain assembly comprising a series of overlapping and interlaced sets of links having pivot means positioned through registered apertures formed in said links, each said aperture being ovate or egg shaped and having a continuous curved surface with a first end section at one end thereof and a larger end section at the opposite end thereof, said apertures being arranged in pairs through said links with the first end section being located at the outer ends of the links and the larger end section being located toward the center of the links, said pivot means being formed of a pair of pins each of which is substantially identical in cross section and having surfaces of larger radii joined by surfaces of smaller radii, one pin functioning as a rocker element with respect to one set of links and as a force transmitting pin with respect to the adjacent links, each pin having a surface of larger radii engaging the other pin in rolling contact, each pin having one of said surfaces of smaller radii conforming with the first end section of the aperture engaging said first end section of the aperture and tightly seated therewith, whereby the stress concentration in said link particularly in the area of the first end section is reduced.

37. A power transmission drive comprising spaced sprockets with teeth and gaps therebetween and a chain assembly comprising a series of overlapping and interlaced sets of links with projecting toes engaging the walls of said sprocket teeth, said chain having pivot means positioned through registered apertures formed in said links, each said aperture being ovate or egg shaped and having a continuous smooth curved surface with a first end section at one end thereof and a larger end section at the opposite end thereof, said apertures being arranged in pairs through said links with the first end section being located at the outer ends of the link and the relatively larger end section being located toward the center of the link, said pivot means being formed of a pair of pins substantially identical in cross-section and having surfaces of larger radii joined by surfaces of smaller radii, one pin functioning as a rocker element with respect to one set of links and a force transmitting pin with respect to the adjacent links, each pin having a surface of larger radii engaging the other pin in rolling contact, each pin having one of said surfaces of smaller radii engaging said first end section of the aperture and tightly seated therewith, whereby the stress concentrations in said links particularly in the area of the first end section is reduced.

* * * * *

UNITED STATES PATENT OFFICE
CERTIFICATE OF CORRECTION

PATENT NO. : 4,010,656
DATED : March 8, 1977
INVENTOR(S) : Joseph O. Jeffrey

It is certified that error appears in the above-identified patent and that said Letters Patent are hereby corrected as shown below:

Column 1, line 20 -- "or" should be inserted between "pin" and "rocker".

Column 2, line 57 -- "The" should be "This".

Column 2, line 62 -- "latter" should be "later".

Column 2, line 67 -- "that" should be "than".

Column 4, line 1 -- "wich" should be "which".

Column 5, line 16 -- "loaded" should be "(loaded)".

Column 5, line 43, "at" should be inserted between "parts" and "assembly"

Column 7, line 3 -- "pair" should be "part".

Signed and Sealed this fifth Day of July 1977

[SEAL]

Attest:

RUTH C. MASON
Attesting Officer

C. MARSHALL DANN
Commissioner of Patents and Trademarks